(12) United States Patent
Kanchana et al.

(10) Patent No.: US 11,421,675 B2
(45) Date of Patent: Aug. 23, 2022

(54) METHOD AND FLUID PUMP FOR CONVEYING A FLUID IN A FLUID CIRCUIT OF A MOTOR VEHICLE

(71) Applicant: BROSE FAHRZEUGTEILE GMBH & CO. KOMMANDITGESELLSCHAFT, WUERZBURG, Wuerzburg (DE)

(72) Inventors: Adarsha Kanchana, Wuerzburg (DE); Christian Bienick, Gerbrunn (DE)

(73) Assignee: BROSE FAHRZEUGTEILE GMBH & CO. KOMMANDITGESELLSCHAFT, WUERZBURG, Wuerzburg (DE)

( * ) Notice: Subject to any disclaimer, the term of this patent is extended or adjusted under 35 U.S.C. 154(b) by 585 days.

(21) Appl. No.: 16/330,654

(22) PCT Filed: Sep. 5, 2017

(86) PCT No.: PCT/EP2017/072139
§ 371 (c)(1),
(2) Date: Mar. 5, 2019

(87) PCT Pub. No.: WO2018/042044
PCT Pub. Date: Mar. 8, 2018

(65) Prior Publication Data
US 2021/0285437 A1    Sep. 16, 2021

(30) Foreign Application Priority Data
Sep. 5, 2016  (DE) .......................... 102016216765.0

(51) Int. Cl.
*F04B 17/03*    (2006.01)
*F04B 49/08*    (2006.01)
(Continued)

(52) U.S. Cl.
CPC .............. *F04B 49/06* (2013.01); *F04B 17/03* (2013.01); *F04B 49/08* (2013.01);
(Continued)

(58) Field of Classification Search
CPC .......... F04B 49/06; F04B 49/08; F04B 17/03; F16H 61/30; F16H 61/0265; F16H 2061/0078
See application file for complete search history.

(56) References Cited

U.S. PATENT DOCUMENTS 4,767,279 A * 8/1988 Dourdeville .......... F04B 49/065
                                                           210/101
5,944,159 A * 8/1999 Schneider ............... F15B 1/033
                                                          192/85.63
(Continued)

FOREIGN PATENT DOCUMENTS

CN     102537328 A     7/2012
CN     102628437 A     8/2012
(Continued)

OTHER PUBLICATIONS

Boswirth, L., Bschorer, S., "Technical Fluid Dynamics," 9th Revised Edition, 2012, Wiesbaden: Vieweg+Teubner Publishers, p. 43.— ISBN 978-3-8348-1718-1.

*Primary Examiner* — Patrick Hamo
(74) *Attorney, Agent, or Firm* — Brooks Kushman P.C.

(57) ABSTRACT

A method for conveying a fluid of a fluid circuit by means of an electric motor-powered fluid pump of a motor vehicle, in particular an oil pump, wherein by means of the fluid pump a fluid pressure of the fluid circuit is adjusted to a target pressure, and wherein an actual pressure of the fluid is determined without a pressure sensor.

17 Claims, 2 Drawing Sheets

(51) Int. Cl.
  *F16H 61/02* (2006.01)
  *F04B 49/06* (2006.01)
  *F16H 61/30* (2006.01)
  *F16H 61/00* (2006.01)
(52) U.S. Cl.
  CPC ......... *F16H 61/0265* (2013.01); *F16H 61/30* (2013.01); *F04B 2203/0207* (2013.01); *F04B 2205/05* (2013.01); *F16H 2061/0078* (2013.01)

(56) References Cited

U.S. PATENT DOCUMENTS

| | | | | |
|---|---|---|---|---|
| 6,017,193 | A * | 1/2000 | Takeuchi | G05D 16/2073 417/20 |
| 7,645,225 | B2 * | 1/2010 | Medvedev | A61M 60/205 600/17 |
| 7,686,589 | B2 * | 3/2010 | Stiles, Jr. | F04D 1/00 417/44.1 |
| 7,845,913 | B2 * | 12/2010 | Stiles, Jr. | F04B 49/106 417/44.11 |
| 7,871,394 | B2 * | 1/2011 | Halbert | A61M 5/1723 604/67 |
| 8,019,479 | B2 * | 9/2011 | Stiles | F04D 15/0066 700/282 |
| 8,328,525 | B2 * | 12/2012 | Saito | F04C 18/0215 417/32 |
| 8,425,200 | B2 * | 4/2013 | Tran | F04B 49/065 417/31 |
| 8,480,373 | B2 * | 7/2013 | Stiles, Jr. | F04D 15/0066 417/43 |
| 8,747,074 | B2 * | 6/2014 | Jeong | B60W 20/00 417/16 |
| 8,827,656 | B2 * | 9/2014 | Sano | F16H 61/30 417/45 |
| 9,897,084 | B2 * | 2/2018 | Cheng | G05D 7/0676 |
| 9,938,970 | B2 * | 4/2018 | Cheng | F04B 17/03 |
| 2011/0182752 | A1 * | 7/2011 | Frank | F04B 49/106 417/32 |

FOREIGN PATENT DOCUMENTS

| | | |
|---|---|---|
| CN | 105765473 A | 7/2016 |
| DE | 19647940 A1 | 5/1998 |
| DE | 10345449 A1 | 5/2004 |
| DE | 102004012639 A1 | 10/2004 |
| DE | 102004046950 A1 | 4/2006 |
| DE | 102008043127 A1 | 4/2010 |
| DE | 102010001150 A1 | 7/2011 |
| DE | 102011086572 A1 | 5/2012 |
| DE | 102014222335 A1 | 5/2016 |
| EP | 2290264 A2 | 3/2011 |
| WO | 2016066504 A1 | 5/2016 |

* cited by examiner

METHOD AND FLUID PUMP FOR CONVEYING A FLUID IN A FLUID CIRCUIT OF A MOTOR VEHICLE

CROSS-REFERENCE TO RELATED APPLICATIONS

This application is the U.S. National Phase of PCT/EP2017/072139 filed Sep. 5, 2017, which claims priority to DE 10 2016 216 765.0 filed Sep. 5, 2016, the disclosures of which are hereby incorporated in their entirety by reference herein.

TECHNICAL FIELD

The present disclosure lies in the field of pumps, such as electrically or electric motor-operated or driven (fluid) pumps and relates to a method for conveying a fluid of a fluid circuit with an electric motor-driven fluid pump in a motor vehicle, such as in a motor vehicle transmission. Furthermore, it relates to a fluid pump which operates according to such a method and to a motor vehicle transmission having such a fluid pump. Here, a fluid pump is to mean in particular an auxiliary or main pump, such as an oil pump, in or for a motor vehicle.

BACKGROUND

An electric fluid pump and in particular also a so-called auxiliary or additional pump serves for example for conveying oil as (hydraulic) fluid for control tasks or for cooling for in particular moving parts or components, for example also of a vehicle (motor vehicle) that is driven by way of an internal combustion engine, by hybrid-technology or electrically. Because of its conveying characteristics, such an oil pump usually creates a (closed) oil circuit (fluid circuit) with a pressure and volume flow.

SUMMARY

The present disclosure may provide a particularly suitable method for conveying a fluid of a fluid circuit with an electric motor-driven fluid pump of a motor vehicle. The disclosure, furthermore, may include a fluid pump operating according to such a method and a motor vehicle transmission comprising such a fluid pump.

One or more methods according to the present disclosure is suitable and equipped for conveying a fluid of a fluid circuit with an electric motor-driven fluid pump of a motor vehicle.

According to the method, a closed-loop pressure control by way of a current (hydraulic) fluid pressure of the fluid in the fluid circuit (operating pressure) is provided for activating the fluid pump. For this purpose, an actual pressure and a set point pressure of the fluid are determined and compared with one another. As a function of the comparison, the fluid pump or the electric motor of the same is activated in such a manner that based on the variable flow rate the fluid pressure in the fluid circuit is set to the set point pressure. Here a determination or detection without pressure sensor of the actual pressure is provided, which means that the actual pressure is not monitored with a (fluid) pressure sensor of the fluid circuit.

In other words it is made possible to embody the fluid circuit without a cost-intensive (fluid) pressure sensor. As a consequence, the manufacturing and operating costs of the fluid circuit are reduced. Furthermore, cabling between a pressure sensor and the fluid pump is thus avoided, as a result of which on the one hand a reduction of the maintenance and repair costs and on the other hand a saving of the construction weight and construction size are made possible. Subsequently, this advantageously applies to the range of the motor vehicle.

The fluid pump, for example, is an electric motor-driven water pump, preferentially an electric motor-driven auxiliary or additional pump for the motor vehicle, in particular an oil pump for lubrication and/or control of transmission parts of a motor vehicle transmission. The conveyed fluid in this case is practically (transmission) oil for example ATF oil (automatic transmission fluid), and serves for example also for cooling the components or additional components of a drive train of such a motor vehicle. Here, the term oil must not be understood as being limited to mineral oils. On the contrary, fully synthetic or part-synthetic oil, a silicone oil or other oil-like liquids such as for example a hydraulic liquid or a cooling lubricant can also be used.

In a suitable manner, the fluid pump comprises pump electronics with a pump controller, with which the electric motor is open-loop and/or closed-loop controlled preferentially in a field-oriented manner. The electric motor is preferentially embodied as a brushless direct current motor, which is operated with a three-phase current of pump electronics. A rotor of the electric motor is non-rotatably connected to a pump rotor, so that during the operation the fluid is conveyed from a pump inlet (low pressure, suction side) to a pump outlet (pressure side). In an alternative embodiment, the pump electronics open-loop and/or closed-loop control multiple electric motor-driven pump drives. This is advantageous for example in an application in a direct shift transmission (DSG), in which pump electronics activate multiple electric motor-driven auxiliary drives for pressure generation.

In a suitable further development, the actual pressure of the fluid is determined by way of operating data of the fluid pump. In particular, the pump controller monitors the operating data of the fluid pump detected during the operation. Because of this, determining the actual pressure without pressure sensor is made possible in a simple and cost-effective manner.

In a conceivable embodiment, in particular a load torque of the fluid pump and a fluid viscosity of the fluid are determined with the operating parameters for determining the actual pressure. The load torque of the fluid pump in this case is substantially the static torque which the fluid pump or the pump rotor has to generate relative to the fluid pressure that is present in the fluid circuit, in particular during a stable or settled state of the fluid circuit following a starting of the fluid pump. In other words, this load torque is proportional to the actual pressure, in particular, the load torque has a linear dependency on the actual pressure. The proportionality factor, which forms the relationship between the load torque and the actual pressure, is dependent in this case on the fluid viscosity of the conveyed fluid. Because of this, a simple determination of the actual pressure is possible with a knowledge of the load torque and of the fluid viscosity.

In a practical configuration, the load torque is determined from a differential of an actual torque of the electric motor of the fluid pump and a dynamic torque of the dynamic characteristics of the fluid. The actual torque of the electric motor in this case corresponds substantially to the overall torque to be generated during operation for conveying the fluid. The actual torque can be monitored by the pump controller as operating parameter of the fluid pump. For this purpose, the actual three-phase current for energizing the stator windings is monitored for example, which is correlated to the generated actual torque. The actual three-phase current is dependent on the solenoid or coil temperature of the stator so that the same is practically likewise detected.

The actual torque to be generated is composed of the pressure-dependent load torque and the dynamic torque that is kept in particular as control reserve. On the one hand, the dynamic torque may include a known design-dependent mass moment of inertia of the pump rotor and a system moment of inertia, which is dependent on the fluid viscosity and temperature of the fluid to be conveyed. The actual torque is monitored as operating parameter during the operation by the pump controller so that with a given dynamic torque, the load torque desired for the actual pressure determination can be easily determined by forming the difference.

In an advantageous configuration, a step-like torque increase (torque gradient) is determined during a starting operation of the fluid pump for determining the dynamic torque. The torque increase that occurs during the starting or run-up of the fluid pump is invariant relative to the fluid pressure of the fluid circuit and substantially describes the dynamic characteristics of the fluid (system moment of inertia). Because of this it is possible to subtract the value of the dynamic torque known from the start of the fluid pump from the static torque for the settled (operating) state of the fluid pump. By way of this, the effects caused by the fluid viscosity can be purged from the load torque defined by the fluid pressure (actual pressure).

Thus, the load torque that is substantially known is, by a fluid-viscosity-dependent factor, proportional to the actual pressure to be determined. During the operation of the fluid pump, temperature changes of the fluid circuit and thus of the fluid conducted therein are possible. The temperature range in the fluid circuit to be managed or taken into account is for example between −40° C. and +130° C. Here it may be taken into account that the employed fluid has a certain or defined (fluid) viscosity which is dependent on the temperature and decreases with increasing temperature, i.e. that is higher at lower temperatures than at higher temperatures.

In a suitable further development, the fluid viscosity is determined by way of a fluid temperature, in particular the temperature of the fluid in the fluid circuit. With an employed fluid, the value of the fluid viscosity is known for a given temperature, for example from a datasheet. By way of this, the corresponding fluid viscosity can be easily determined by determining the fluid temperature. For this purpose, the pump controller may include for example a stored table or a characteristic curve with which a fluid temperature value is assigned a corresponding value of the fluid viscosity. To this end, the fluid circuit may include for example an integrated (fluid) temperature sensor.

In one or more embodiments, the fluid circuit is embodied without temperature sensor, and the fluid temperature may be determined by a thermal transfer model by way of an operating temperature of pump electronics of the fluid pump. Because of this, a temperature sensor of the fluid circuit is not required, as a result of which the fluid circuit becomes particularly cost-effective. The operating temperature of pump electronics in this case is monitored as operating parameter of the fluid pump. Because of this, the fact that pump electronics and the fluid are at least partially in a thermally conductive contact with one another is utilized in an advantageous and simple manner. This thermally-conductive contact is at least approximately described by the transfer model.

The operating temperature is for example a barrier layer temperature of a semiconductor switch of pump electronics or a temperature of a circuit board (PCB board) carrying pump electronics. Using the transfer model, a value for the temperature of the fluid in the fluid circuit can be determined by way of the operating temperature, with which as a consequence the (actual) fluid viscosity can be determined.

By knowing the fluid viscosity and the load torque a simple determination of the value of the actual pressure in the fluid circuit is thus made possible without pressure sensor. In particular, the actual pressure in this case is merely determined by operating parameters of the fluid pump which for a trouble-free operation of the fluid pump is monitored by the pump controller anyway. By way of this, a particularly simple, low-expenditure and advantageous determination of the actual pressure is realized.

An additional or further aspect of the method according to the invention provides that the set point pressure is adaptively adjusted. For example, the set point pressure in this case may be adapted by operating parameters of the fluid circuit not related to the fluid pump. For this purpose, a controller of the fluid circuit for example is signal-connected to the pump controller via a (bus) interface. In other words, the actual pressure is determined and/or adapted in particular by way of operating parameters of the fluid pump and the set point pressure in particular by way of operating parameters of the fluid circuit.

In a possible form of application, the fluid pump and the fluid circuit are part of a (motor vehicle) change-gear transmission (automatic transmission, double clutch transmission), wherein the controller sends information to the pump controller via a motor rotational speed and/or a gear change status. Such information influences the fluid pressure merely indirectly, but makes possible a prediction of the requirement profile or of the set point pressure. In other words, the set point pressure is in particular predictively adjusted for the adaptive adjustment. For this purpose, means and methods for machine-learning (big data, auto-learning) are integrated in the pump controller. By way of this, the pump controller is suitable and equipped for predictively and adaptively determining a value for the set point pressure by way of known driving or shifting situations that occurred previously. As a consequence, this advantageously applies to the efficiency of the fluid pump or of the fluid circuit and the motor vehicle transmissions equipped with such.

In a particular further development, a Kalman filter is used for adapting the set point pressure. In particular in an application in a change-gear transmission, the variance of the shifting operations to be expected as a function of the detected operating parameters of the fluid circuit and/or of the fluid pump as well as of the available vehicle parameters (vehicle speed, motor rotational speed, . . . ) is comparatively low. By way of this it is possible to make the prediction for the set point pressure by way of a Kalman filter that is easily implemented. Thus, a status estimate or set point pressure estimate is easily possible. In other words, the pump controller substantially learns the shifting strategy by way of the operating parameters and the vehicle parameters.

With the algorithm of the Kalman filter, a linear quadratic estimation (LQE) is created in particular for the set point pressure. For this purpose, the driving or shifting situations that occurred previously may be converted by a Bayesian conclusions and estimations by way of a probability function in an estimated value for the required (future) set point pressure. Since the deviations (variance) of the driving or shifting situations are comparatively low, comparatively accurate and precise predictions for the set point pressure are thus made possible.

The electric motor-driven fluid pump according to the invention is suitable and equipped for conveying a fluid of a fluid circuit of a motor vehicle, in particular in a motor vehicle transmission. Here, the fluid pump may include an integrated pump electronics and a pump controller (control unit), which is provided and equipped for carrying out the method according to the invention described above. Thus, the pump controller is concretely equipped during the pump operation to regulate a fluid pressure of the fluid in the fluid circuit to a set point pressure and determine the actual pressure of the fluid required for the closed-loop control without pressure sensor.

In one or more embodiments, the controller is formed, at least in the core, by a microcontroller with a processor and a data memory, in which the functionality for carrying out the method according to the invention is program-technically implemented in the form of an operating software (firmware), so that the method—if required interacting with a vehicle user—is automatically carried out when the operating software is embodied in the microcontroller.

However, the controller may be alternatively formed by a non-programmable electronic component, for example an ASIC (application-specifically integrated circuit) or an FPGA (field programmable gate array), in which the functionality for carrying out the method according to the invention is implemented with circuit-related means.

The fluid pump operated with the method is thus suitable and equipped for a closed-loop control of the fluid pressure in the pressure circuit without pressure sensor. Because of this, a particularly cost-effective and component-reduced fluid pump is made possible. Furthermore, a particularly effective operation of the fluid pump with as high as possible an efficiency is ensured.

In another embodiment, the fluid circuit is embodied without pressure sensor. This means that the fluid circuit does not comprise a (fluid) pressure sensor for detecting the actual pressure. Because of this, signal lines between the fluid circuit and the fluid pump are saved which has an advantageous effect on a (construction) weight reduction and thus cost savings.

In a suitable configuration, the pump controller is signal-connected to a controller of the fluid circuit. Because of this, the adaptive adjustment of the set point pressure by way of non-pump-related indicators is made possible.

In one or more embodiments, the fluid pump and the fluid circuit that is coupled to the former are part of a vehicle transmission. The fluid pump is preferentially an electric motor-driven auxiliary or additional pump. Because of this, a component-reduced and cost-effective motor vehicle transmission is realized.

BRIEF DESCRIPTION OF THE DRAWINGS

In the following, an exemplary embodiment of the invention is explained in more detail by way of a drawing. Therein shows in simplified and schematic representations.

DETAILED DESCRIPTION

Figure 1:
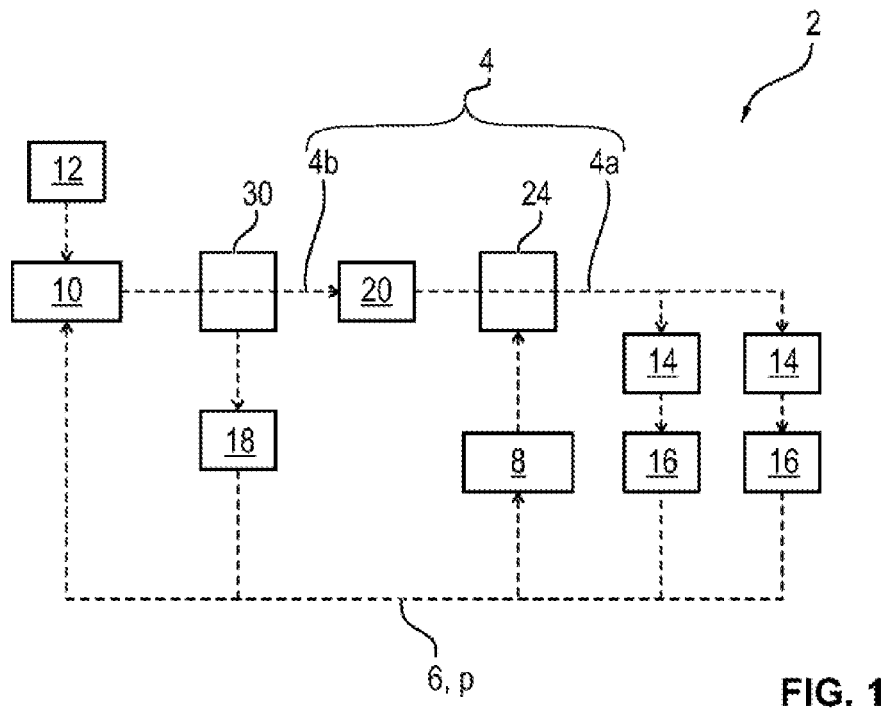
FIG. 1 a hydraulic system of a motor vehicle transmission with a fluid circuit and with an electric motor-driven fluid pump, FIG. 2 an interface model of a pump controller of the fluid pump, and FIG. 3 a diagram of an actual torque of the fluid pump during a starting operation.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Parts and quantities corresponding to one another are always marked with the same reference characters in all figures.

Frequently, an electrically or electric motor-driven auxiliary or additional pump for example also serves for the at least occasional lubrication or additional lubrication of transmission parts of a motor vehicle transmission, in particular of an automatic transmission. The conveyed oil, furthermore, serves also for cooling the components or additional components or the drive train of such a motor vehicle. The auxiliary or additional pump, furthermore, makes possible or supports expanded driving functions of the motor vehicle such as for example a coasting or a start-stop function.

For the open-loop and/or closed-loop control, such a fluid pump usually comprises pump electronics that can be open-loop and/or closed-loop controlled with a pump controller, with which the operating point of the electric motor is adjusted. For this purpose, the (hydraulic) fluid pressure of the fluid in the fluid circuit is monitored in particular with the pump controller. For this purpose, the fluid circuit typically comprises a (fluid) pressure sensor, which detects the current value of the actual pressure of the fluid in the fluid circuit, feeding the same to the pump controller. The pump controller compares the detected actual pressure with a desired set point pressure and activates the fluid pump or the electric motor of the same as a function of the comparison. In particular, the fluid pressure in this case is adjusted by adjusting the flow rate of the fluid pump to the desired set point pressure.

From DE 103 45 449 A1 a device for conveying a fluid in a motor vehicle transmission is known. The known device may include a pressure sensor that is coupled to a fluid circuit, which during the operation detects an actual fluid pressure of the fluid circuit (actual pressure) feeding it to a controller (pump controller) of a fluid pump. The controller, furthermore, is coupled to a sensor which detects a vehicle driving state. By way of the vehicle driving state, the controller determines a threshold value (set point pressure) with which the detected fluid pressure is compared.

Pressure sensors for such (fluid) pressure controls (closed-loop control) are susceptible to error and involve comparatively high operating and manufacturing costs. Furthermore, the required cable routing (cable harness) needed for the signal transmission of the actual pressure between the fluid pressure sensor in the fluid circuit and the pump controller of the fluid pump cause additional construction weight and increased manufacturing costs.

EP 2 290 264 A2 describes a motor vehicle transmission having a device for conveying a fluid, having a fluid circuit with a fluid pump. The motor vehicle transmission has a continuously variable rotational speed changing device. A (transmission) controller calculates during a shifting operation, during which gears are shifted between two transmission gears of the motor vehicle transmission, a set point pressure required for this purpose by way of a moment of inertia and of an input torque of the rotational speed changing device. The calculated set point pressure is sent to a pump controller which activates the fluid pump accordingly.

Such pressure controls (open-loop control) without pressure sensors can be manufactured comparatively cost-effectively. However, because of the absent closed-loop control, no effective conveying of the fluid is ensured, as a result of which the efficiency of the fluid pump or of the motor vehicle transmission is disadvantageously influenced.

The hydraulic system 2 shown in FIG. 1 is suitable and equipped for actuating and lubricating a motor vehicle transmission that is not shown in more detail, in particular of a change-gear transmission of a motor vehicle. For this purpose, the hydraulic system 2 may include a fluid or oil circuit 4 shown in dashed lines for conducting a (hydraulic) fluid 6, in particular of a (transmission) oil. For conveying the oil 6 in the oil circuit 4, the hydraulic system 2 may include two fluid or oil pumps 8 and 10. Here, the oil pump 8 is formed as a main pump and the oil pump 10 as an auxiliary or additional pump of the oil circuit 4.

Here, the oil pump 8 is coupled to an internal combustion engine of the motor vehicle and functionally effectively drivable for conveying the oil 6 by an internal combustion engine. The oil pump 10 is embodied as electric motor-driven and may include a driving electric motor 12. The electric motor 12 is embodied for example as a brushless direct current motor and may include a rotatably mounted rotor which is non-rotatably coupled to a pump rotor.

The oil circuit 4 may include a high pressure branch (primary circuit) 4a and a low pressure branch (secondary circuit) 4b. The high pressure branch 4a in this exemplary embodiment may include two hydraulically controllable valves 14, with which a coupling 16 of the motor vehicle transmission each can be actuated during the course of a shifting operation. On the outlet side, the oil pump 8 is connected to the high pressure branch 4a. By way of a pressure limiting valve 18, the oil pump 8 is flow-connected to the low pressure branch 4b. Here, the oil pump 10 is connected to the outlet side (pressure side) of the oil pump 8 by a non-return valve 20.

During the operation of the hydraulic system 2, the oil pump 10 conveys the oil 6 into the high pressure branch 4a when the flow rate of the oil pump 8 is smaller than a threshold value. The flow rate of the oil pumps 8 and 10 in this case is monitored in particular via the fluid or oil pressure p of the oil 6 in the oil circuit 4.

For monitoring and regulating the oil pressure p in the oil circuit 4, a controller (control unit) 22 of the fluid circuit is provided on the one hand, which in terms of signal is directed for example to a motor control of the internal combustion engine and/or of a transmission control of the change gear transmission. Here, the controller 22 monitors in the region of an interface 24 the oil pressure p for activating the valves 14. On the other hand, the oil pump 10 may include pump electronics 26 with a pump controller 28, which determines the oil pressure p in the region of an interface 30. In other words, the controller 22 monitors in particular the oil pressure p in the main pressure branch 4a and the pump controller 28 the oil pressure p in the secondary pressure branch 4b.

Figure 2:
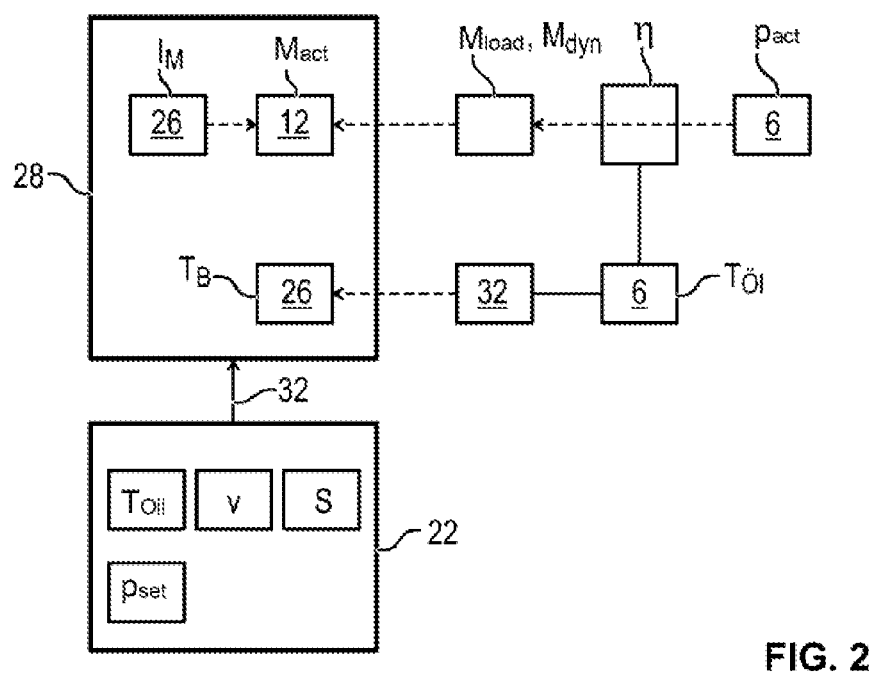

In the following, the operation of the oil pump 10 is explained in more detail by way of FIG. 2. In FIG. 2, a schematic interface model of the pump controller 28 with the controller 22 is shown. Here, the pump controller 28 and the controller 22 are signal-coupled by a bus interface 32.

During the operation, the pump controller 28 is designed in particular for carrying out a pressure closed-loop control for the oil circuit 4, during which an actual pressure $p_{act}$ of the oil 6 is regulated to a set point pressure $p_{set}$. By way of the comparison, the rotation speed and thus the flow rate of the electric motor 12 and the oil pump 10 respectively are adjusted by the pump controller 28. The pump controller 28 determines the actual pressure $p_{act}$ of the oil 6 without pressure sensor which means that the oil circuit 4 does not have a pressure sensor that is coupled to the pump controller 28.

The pump controller 28 determines the value for the current actual pressure $p_{act}$ by evaluating detected and monitored operating data of the oil pump 10. For this purpose, the pump controller 28 during the operation detects a phase current $I_M$ of pump electronics 26 for driving the electric motor 12. The phase current (three phase current) $I_M$ is fed here to a stator or phase winding of the electric motor 12, as a result of which a magnetic rotational field is created, which causes the rotor to rotate. Furthermore, the pump controller 28 detects the actual torque $M_{act}$ of the oil pump 10 thereby generated during the operation, and an operating temperature $T_B$ of pump electronics 26.

For determining the actual pressure $p_{act}$, the pump controller 28 evaluates a load torque $M_{load}$ of the oil pump 10 that occurs during the operation and a (fluid) viscosity $\eta$ of the oil 6. The load torque $M_{load}$ in this case is the static torque which the oil pump 10, in a settled state, i.e. in a stable operating point following a starting operation, has to generate relative to the actual pressure $p_{act}$ of the oil circuit 4 in order to convey the oil 6. The load torque $M_{load}$ is coupled to the actual pressure $p_{act}$ to be determined by a proportionality factor that is dependent on the oil viscosity $\eta$.

Here, the load torque $M_{load}$ is not directly detectable by the pump controller 28 as an operating parameter of the oil pump 10. However, the load torque $M_{load}$ is contained in the actual torque $M_{act}$ of the electric motor 12 of the oil pump 10 to be generated. The actual torque $M_{act}$ in this case is additively composed of the load torque $M_{load}$ and a dynamic torque $M_{dyn}$.

The dynamic torque $M_{dyn}$ retained as regulating reserve of the oil pump 10 describes in particular the dynamic characteristics of the oil 6. The dynamic torque $M_{dyn}$ in this case may include on the one hand a known design-dependent mass moment of inertia of the pump rotor and a system moment of inertia, which is dependent on the oil viscosity $\eta$ and an (oil) temperature $T_{oil}$ of the oil 6 to be conveyed.

For determining the dynamic torque $M_{dyn}$, the pump controller 28 detects the course of the actual torque $M_{act}$ during a run-up or starting operation, during which the oil pump 10 is accelerated from a stationary state to an operating rotational speed.

Figure 3:
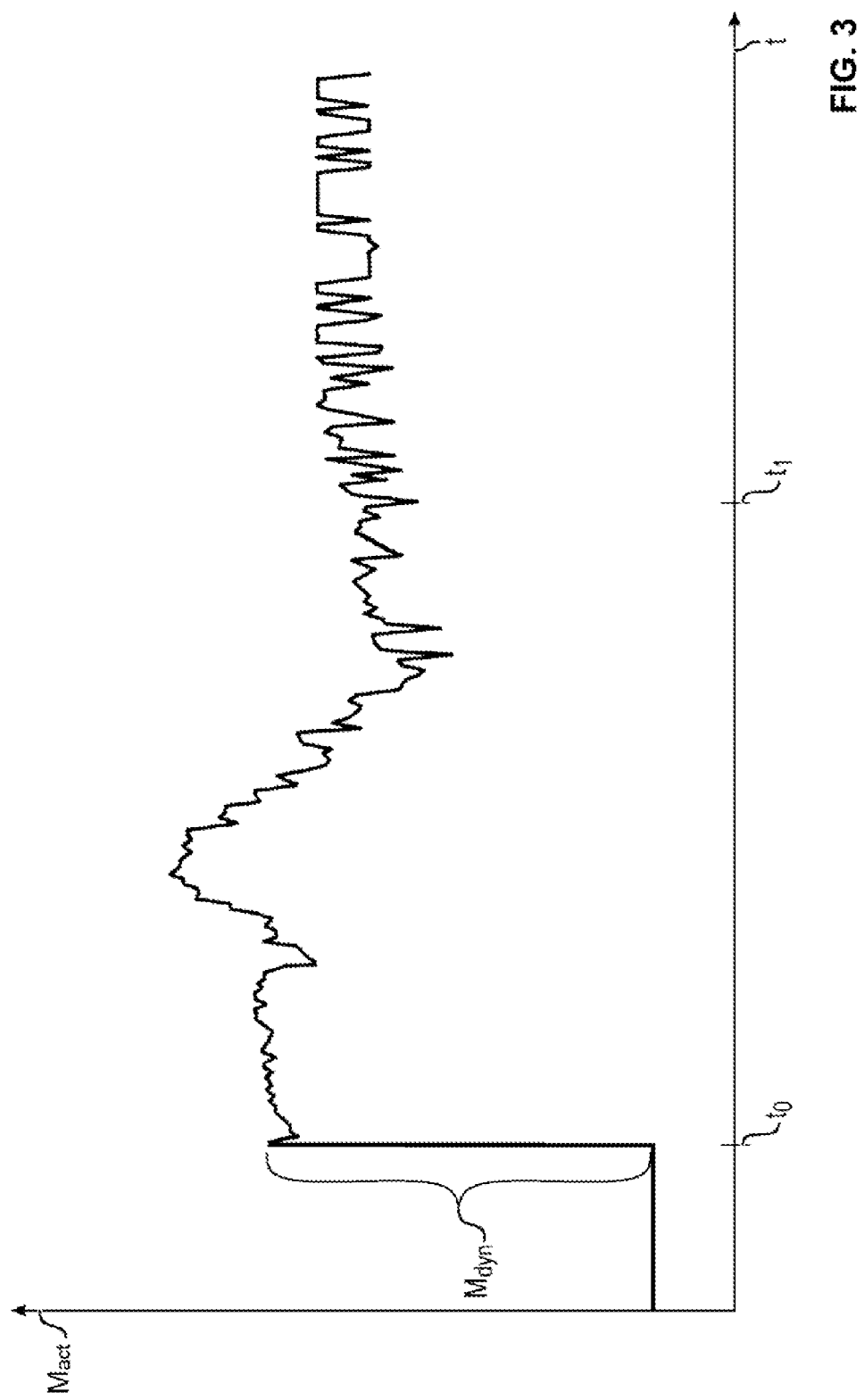

In FIG. 3, an exemplary time curve of the actual torque $M_{act}$ during a run-up operation is shown, during which the pressure limiting valve 18 is open. In the schematic diagram of FIG. 3, a time t is plotted on the abscissa axis (x-axis) and the actual torque $M_{act}$ is plotted on the ordinate axis (y-axis).

At a time $t_0$, the oil pump 10 is started. As is comparatively clearly evident in FIG. 3, a sudden or step-like torque increase or torque gradient occurs here. At a delayed time $t_1$, the run-up operation ends and a desired operating rotational speed or operating torque reached.

The torque increase that occurs during the starting or run-up of the oil pump is invariant here relative to the oil pressure p of the oil circuit 4 and substantially describes the dynamic characteristics of the oil 6 (system moment of inertia). By way of this, the dynamic torque $M_{dyn}$ results substantially by the jump height or the torque gradient in the region about the time $t_0$.

Because of this, the dynamic torque $M_{dyn}$ can be determined by the pump controller 28 during the run-up of the oil pump 10. As a consequence, the load torque $M_{load}$ that is relevant for determining the actual pressure $p_{act}$ can be determined as a simple subtraction of the actual torque $M_{act}$ from the dynamic torque $M_{dyn}$.

The proportionality factor between the load torque $M_{load}$ and the actual pressure $p_{act}$ that occurs in the oil circuit 4 is dependent on the oil viscosity $\eta$. The oil viscosity $\eta$ varies with the oil temperature $T_{oil}$ in the oil circuit 4. During the operation of the hydraulic system 2, temperature changes of the oil 6 occur in the oil circuit 4 and thus corresponding changes of the oil viscosity $\eta$. As one example, a corresponding table or characteristic curve of the material or fluid characteristics of the oil 6 are stored in a memory of the pump controller 28, so that a certain oil temperature $T_{oil}$ is assigned a respective corresponding value of the oil viscosity $\eta$.

In this exemplary embodiment, the oil temperature $T_{oil}$ is determined by the pump controller 28 without temperature sensor which means without a measurement or sensor signal of a temperature sensor in the oil circuit 6. For this purpose, the pump controller 28 evaluates the detected operating temperature $T_B$ of pump electronics 26. As operating temperature $T_B$, for example a barrier layer temperature of a semiconductor switch of an inverter of pump electronics 26 or a temperature of a circuit board (PCB board) carrying pump electronics 26 is monitored here. Here, a transfer model 34 for example in the form of a table or a characteristic curve is stored in the pump controller 28 with which the detected operating temperature $T_B$ is assigned a value for the oil temperature $T_{oil}$ in the oil circuit 4.

By way of the oil temperature $T_{oil}$ thus determined, the oil viscosity $\eta$ is obtained as a consequence, as a result of which the proportionality factor between the load torque $M_{load}$ and the actual pressure $p_{act}$ that occurs in the oil circuit 4 can be determined. By way of this it is possible in a simple manner that the pump controller 28 determines the value for the actual pressure $p_{act}$ in the oil circuit 4 merely by way of the operating parameters of the oil pump 10.

The set point pressure $p_{set}$ needed for the pressure closed-loop control of the oil pump 10 is determined by the controller 22 of the oil circuit 4. In particular, the value of the set point pressure $p_{set}$ is dynamically and adaptively adjusted to the respective transmission or driving situation of the motor vehicle in particular by a Kalman filter.

In this exemplary embodiment, the set point pressure $p_{set}$ is predicted for example by the pump controller 28 and adjusted or the plausibility checked by evaluation by a non-oil pump-related operating parameters (vehicle parameters) transmitted by the controller 22. For this purpose, the controller 22 transmits for example the values of a motor speed v and of a gear change status S as well as the oil temperature $T_{oil}$. The pump controller 28 in this case is equipped for machine learning so that for example by way of the received motor speed v and of the gear change status S a prediction of the requirement profile or of the desired set point pressure $p_{set}$ takes place. In other words, a predictive pressure closed-loop control in the oil circuit 4 is carried out by way of known driving or shifting situations that occurred previously. By way of this a particularly effective and operationally secure operation of the motor vehicle transmission is ensured.

Here, no direct influence is imposed on the shifting behavior. By way of the Kalman filter, merely a correction of the actual pressure $p_{act}$ is carried out, the actual pressure requirement however is not influenced here. The signal processing of different vehicle interfaces (e.g. route profile, route gradient, traffic, . . . ) and the concomitant, moderate adaptation of the set point or actual pressure $p_{set}$ and $p_{act}$ respectively is provided. For example, it is possible in heavy traffic to predict an increased frequency of the shifting operations. Because of this, the pump controller 28 controls for example to a slightly elevated oil pressure p so that through the reserve created by this, the imminent shifting operations are optimized.

The invention is not restricted to the exemplary embodiment described above. On the contrary, other versions of the invention can also be derived from this by the person skilled in the art without leaving the scope of the invention. In particular, all individual features described in connection with the exemplary embodiment can also be combined with one another in another way without leaving the scope of the invention.

Accordingly, the method according to the invention is not restricted to a hydraulic system 2 as shown in FIG. 1. Accordingly it is possible for example that the hydraulic system 2 does not have any primary pressure control device or no pressure limiting valve 18. The application of the method with a water pump of a motor vehicle is likewise conceivable. It is substantial that the assigned actual pressure $p_{act}$ of the conveyed fluid 6 is determined without pressure sensor.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCE LIST

2 Hydraulic system
4 Fluid circuit/oil circuit
4a Main pressure branch
4b Secondary pressure branch
6 Fluid/oil
8 Fluid pump/oil pump/main pump
10 Fluid pump/oil pump/auxiliary pump
12 Electric motor
14 Valve
16 Coupling
18 Pressure limiting valve
20 Non-return valve
22 Controller
24 Interface
26 Pump electronics
28 Pump controller
30 Interface
32 Bus interface
34 Transfer model
p Fluid pressure/oil pressure
$p_{act}$ Actual pressure
$p_{set}$ Set point pressure $I_M$ Phase current
$M_{act}$ Actual torque
$M_{load}$ Load torque
$M_{dyn}$ Dynamic torque
$T_{oil}$ Fluid temperature/oil temperature
$T_B$ Operating temperature
$\eta$ Fluid viscosity/oil viscosity
t Time
$t_0$, $t_1$ Point of time
v Motor speed
S Gear change status

The invention claimed is:

1. A method of conveying a fluid of a fluid circuit including an electric motor-driven fluid pump in a motor vehicle, the method comprising:
regulating a fluid pressure in the fluid circuit to a set point pressure via the fluid pump;
determining an actual pressure of the fluid, without a pressure sensor, based on a load torque of the fluid pump and a viscosity of the fluid; and
determining the load torque based on a difference of an actual torque of the electric motor of the fluid pump and a dynamic torque based on dynamic characteristics of the fluid.

2. The method of claim 1, wherein the step includes determining the actual pressure of the fluid and wherein the actual pressure is based on operating data of the fluid pump.

3. The method of claim 1, further comprising determining the dynamic torque by way of a step-like torque increase during a run-up operation of the fluid pump.

4. The method of claim 1, further comprising determining the fluid viscosity based on a fluid temperature.

5. The method of claim 4, further comprising determining the fluid temperature by a thermal transfer model by way of an operating temperature of pump electronics of the fluid pump.

6. The method of claim 1, further comprising adaptively adjusting the set point pressure.

7. The method of claim 6, wherein adaptively adjusting the set point pressure is adaptively adjusted using a Kalman filter.

8. An electric motor-driven fluid pump for a motor vehicle comprising:
a pump configured to convey a fluid through a fluid circuit;
pump electronics; and
a pump controller configured to:
determine a temperature of the fluid by a thermal transfer model by way of an operating temperature of the pump electronics;
determine a viscosity of the fluid based on the temperature of the fluid; and
determine an actual pressure of the fluid, without use of a pressure sensor, based on a load torque of the pump and the viscosity of the fluid; and
regulate pressure of the fluid with the pump to a set point pressure based on the actual pressure.

9. The fluid pump of claim 8, wherein the pump controller is signal-coupled to a controller of the fluid circuit.

10. The fluid pump of claim 8, wherein the fluid circuit is provided in a motor vehicle transmission.

11. A method of regulating pressure of a fluid pump including an electric motor and disposed in a fluid circuit disposed in a motor vehicle, the method comprising:
receiving first signals indicative of a torque of the electric motor;
receiving second signals indicative of a dynamic torque of the fluid pump; and
altering the pressure of the fluid pump based on the first and second signals.

12. The method of claim 11, further comprising monitoring a three-phase current of the electric motor, wherein the first signals include the monitored three-phase current of the electric motor.

13. The method of claim 12, wherein monitoring the three-phase current of the electric motor includes measuring a coil temperature of a stator of the electric motor.

14. The method of claim 11, further comprising measuring an operating temperature of a circuit board of the fluid pump, wherein the second signals include the measured operating temperature.

15. The method of claim 11, further comprising receiving third signals indicative of a gear change event, wherein the altering step includes altering the pressure of the fluid pump based on the third signals.

16. The method of claim 15, further comprising predicting a set point, set by a fluid circuit controller, wherein the predicting step is based on receiving the third signals.

17. The method of claim 15, further comprising applying a Kalman filter in response to receiving a plurality of third signals indicative of a plurality of gear change events, to determine a probability of an occurrence of a future gear change event.

* * * * *